United States Patent

[11] 3,600,031

| [72] | Inventors | Fred K. Coleman<br>Los Alamitos;<br>Robert B. Schmid, South Gate, both of, Calif. |
|---|---|---|
| [21] | Appl. No. | 786,156 |
| [22] | Filed | Dec. 23, 1968 |
| [45] | Patented | Aug. 17, 1971 |
| [73] | Assignee | Ameron, Inc.<br>Monterey Park, Calif. |

[54] HOISTING COUPLER
5 Claims, 8 Drawing Figs.

[52] U.S. Cl. .................................................. 294/88,
294/110 R, 294/90
[51] Int. Cl. .................................................. B66c 1/66
[50] Field of Search .......................................... 294/82, 83,
83.1, 83.1 A, 84, 85, 86, 86.1, 86.14, 86.15, 86.26,
86.27, 86.29, 86.17, 86.33, 86.34, 76, 87.2, 87.22,
87.24, 88, 90, 91, 97, 100, 106, 110, 113

[56] References Cited
UNITED STATES PATENTS

| 3,032,365 | 5/1962 | Campbell | 294/83.1 |
|---|---|---|---|
| 3,149,851 | 9/1964 | Adams | 294/88 X |
| 3,285,650 | 11/1966 | Dukes | 294/83 |
| 3,413,029 | 11/1968 | Donovan | 294/88 |
| 3,428,356 | 2/1969 | Anderson | 294/110 |

FOREIGN PATENTS

| 882,342 | 5/1943 | France | 294/83 |

*Primary Examiner*—Harvey C. Hornsby
*Assistant Examiner*—W. Scott Carson
*Attorney*—Christie, Parker & Hale

ABSTRACT: The application discloses a coupling device adapted to be suspended from a hoisting line for coupling to an object to be lifted having an upright headed pin. The device receives the pin and has fluid-powered jaws for grasping the pin together with safety means to prevent premature opening or closing of the jaws including a valve means operable by the pin.

PATENTED AUG 17 1971
3,600,031
SHEET 1 OF 2
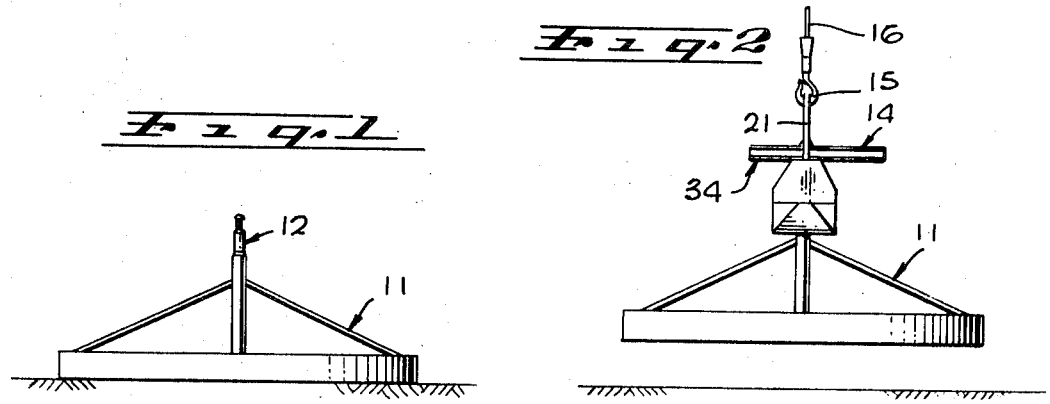
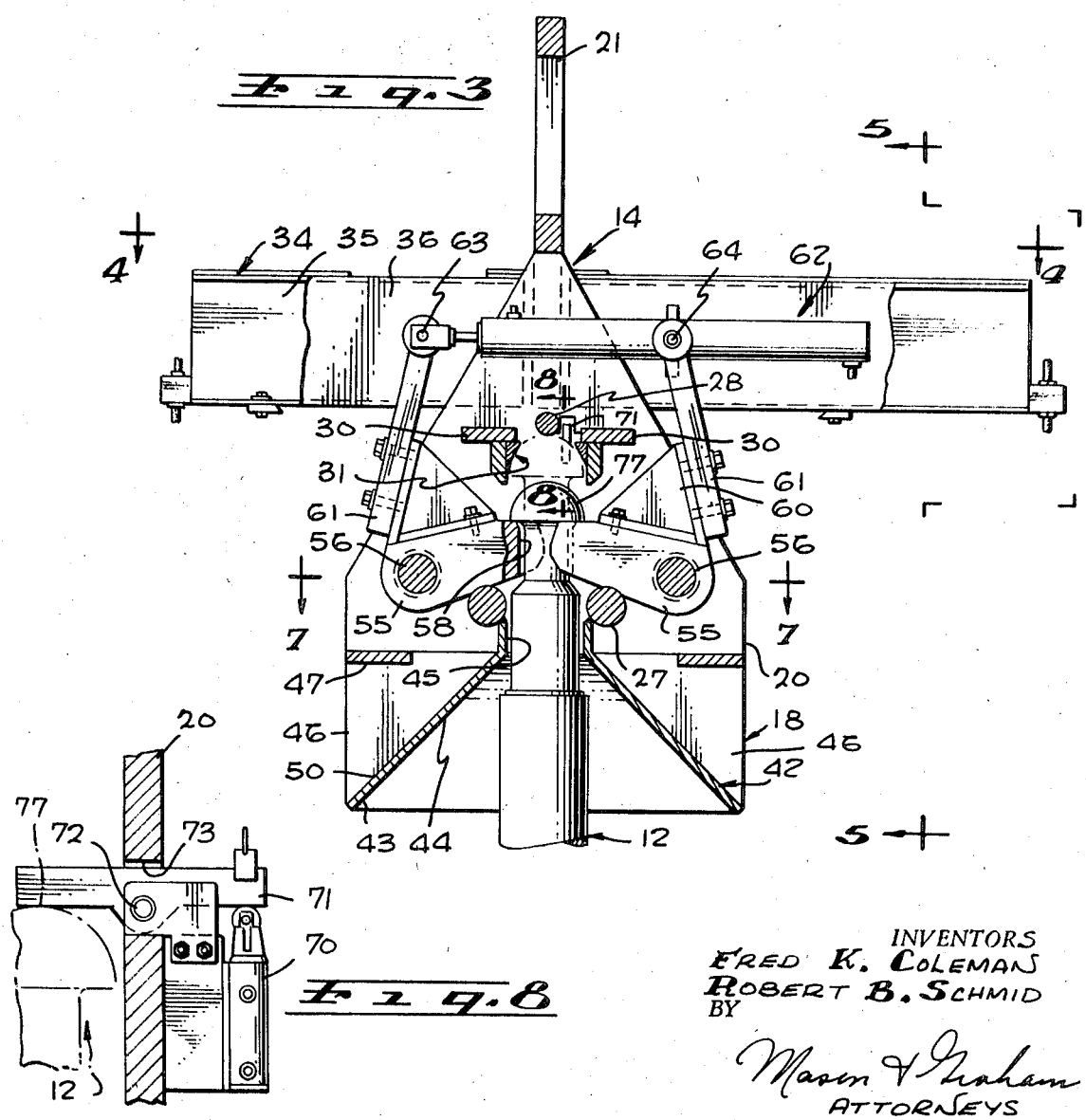
INVENTORS
FRED K. COLEMAN
ROBERT B. SCHMID
BY
Mason & Graham
ATTORNEYS

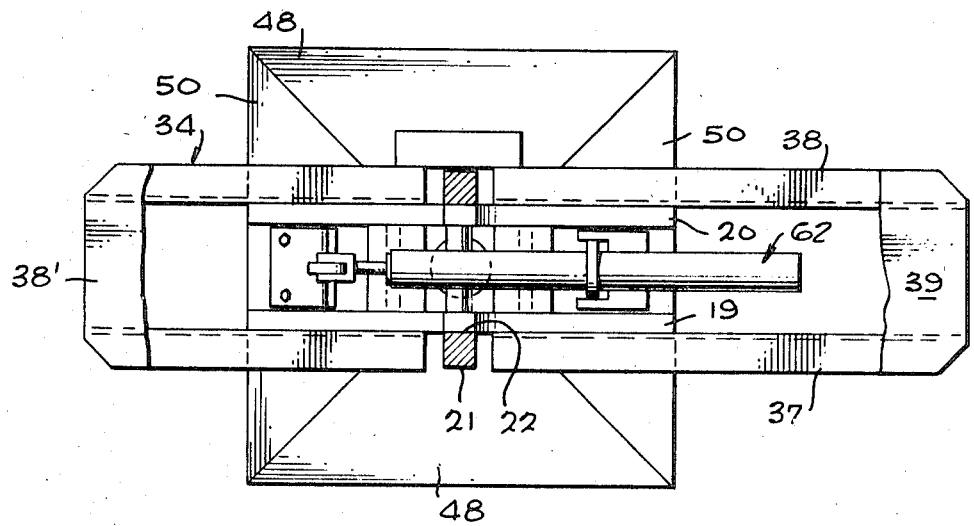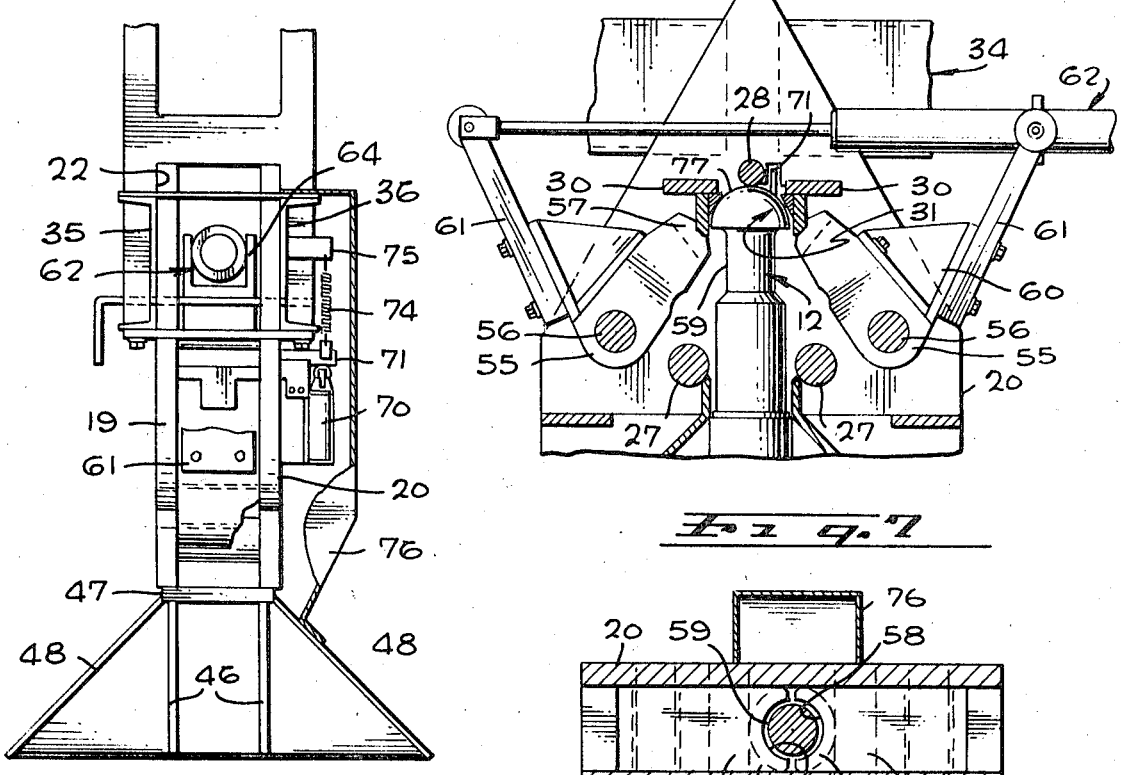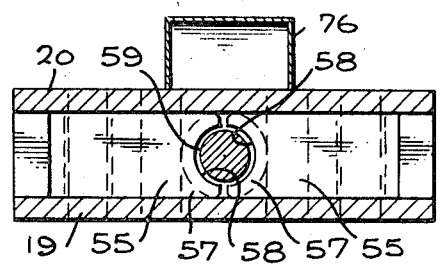

HOISTING COUPLER

The invention has to do generally with coupling devices and particularly with those adapted to be used on the end of a hoisting line for releasably engaging a fixture of the like wherein the fixture is provided with a special part adapted to couple with the coupling device, the fixture normally being attached to the load and usually being designed for a specific load where the lifting operation is repeated for the same type of load as in the manufacture, storage, or transport of a particular product.

An object of the invention is to provide a novel hoisting coupler of new and improved design adapted to releasably attach to or "quickly grab" a fixture having a vertically extending headed pin or the like of any load provided with such a pin.

More particularly it is an object to provide a hoisting coupler embodying power-actuated jaws together with safety means for preventing inadvertent or premature operation of the jaws to either an open or a closed position. In this connection it is an object to provide jaws which are operated by means of a fluid ram or the like and to provide a sequence valve or equivalent means in the pressure fluid supply line to the ram which is actuated by the headed pin of the fixture of the like being lifted, the pin forming the other part of the complete coupling assembly.

By way of summary, the device of the invention is a main coupling unit adapted to be elevated on a hoisting line by conventional means and adapted to receive a lifting or coupling pin. The device includes power-actuated jaws for gripping the pin, and safety means for preventing premature operation of the jaw actuation means which is operated by the pin.

These and other objects will be apparent from the drawings and the following description. Referring to the drawings.

FIG. 1 is a side elevational view of a fixture having the pin portion of a coupling assembly of the invention;

FIG. 2 is a side elevational view showing a coupling device of the invention coupled to the fixture;

FIG. 3 is a central sectional view, partially broken away, of the coupling device of the invention coupled to the fixture, but on a larger scale;

FIG. 4 is a sectional plan view on line 4-4 of FIG. 3 with a portion of the top plate broken away;

FIG. 5 is a partial elevational view on line 5-5 of FIG. 3, but without the pin of the fixture;

FIG. 6 is a fragmentary sectional view similar to FIG. 3, but showing the parts in a different position;

FIG. 7 is a cross-sectional view on line 7-7 of FIG. 3; and

FIG. 8 is a fragmentary sectional view on line 8-8 of FIG. 3, but on a larger scale.

More particularly describing the invention, in FIGS. 1 and 2 I show a fixture 11 provided with an upright, headed pin 12 which may be termed a coupling pin or lifting pin, and a coupling device 14 which is adapted to be lowered over the pin to receive and releasably engage it so that the fixture can be raised. It is contemplated that the fixture would be one suited to be attached to or receive a particular load to be lifted and the shape and size of the fixture has no bearing on the invention apart from the upright pin which forms part of the overall coupling assembly. The coupling device 14 is shown suspended on a standard hook 15 at the end of a line 16 which may depend from a crane or the like (not shown).

The coupling device 14 comprises a body 18 which includes a pair of parallel, laterally spaced side plates 19 and 20 and these are shown provided with a bail 21 at the top for attachment of the device to the hook 15 of a hoisting line, the bail being slotted at 22 to receive the plates and being welded thereto.

Two jaw abutment bars 27 are mounted in the plates 19 and 20, and extend therebetween in parallel laterally spaced relation, the individual bars being equispaced from the vertical axis or center of the device. Above bars 27 and parallel there to on the center of the device, is stop bar 28, which also is mounted in the sideplates. Slightly below the stop are two cross walls 30, which, together with the stop bar 28 and the sidewalls 19 and 20, form the upper and inner end of a socket or receptacle 31 for the pin 12 of the coupling assembly.

A beamlike housing structure 34 extends laterally of the unit and this is made up of two channel sections 35 and 36 extending in one direction, welded or otherwise secured at their inner ends to the sideplates 19 and 20 of the body, and two other, somewhat longer channel sections 37 and 38 welded or otherwise secured to the sideplates at their inner ends and extending oppositely to sections 35 and 36. Cover plates 38' and 39 are provided.

Depending from the body is an entry cone 41 which provides a wide opening 43 and a passage 44 which converges to a central passage 45 in alignment with the inner socket 31. The entry cone includes two spaced exterior support walls 46 at each side depending from cross members 47 and a semipyramid-type wall construction supported thereby comprising sidewalls 48, and end walls 50.

The body is provided with a pair of jaws 55 between the sidewalls. Each of these is pivotally mounted relative to the sideplates on a cross pin 56 and has a jaw portion 57 extending inwardly into the area below the socket 31 of the device, the inner edge of the jaw being formed with a recess 58 to fit a portion of reduced diameter 59 on the headed pin 12. Each jaw is provided with a bracket 60 that rigidly supports an extension or arm designated 61. The latter are connected by a fluid ram or piston-cylinder assembly 62 which is pivotally mounted at 63 and 64 on the ends of members 61.

The cylinder may be operated by compressed air supplied from a suitable source and with remotely operable control valve means. However, it is a feature of the invention to provide safety means to prevent premature or inadvertent actuation of the jaws by the ram, irrespective of manipulation of or the position of the control valve means. Such safety means includes a sequence valve 70 and an operating lever 71 therefor pivotally mounted at 72 in an aperture 73 in sideplate 20. The lever is biased upwardly at its outer end by a tension spring 74 between it and a bracket 75. The inner end of the lever projects into the interior of the body into the socket area 31 and extends somewhat below stop pin 28 in position to be pivoted by the lift pin 12. When so pivoted it operates valve 70 against which the inner end of the lever bears. The valve is connected between the remotely operable controls and the cylinder so that unless the sequence valve is in the retracted position the ram cannot be operated Thus, for example, if the parts are in the position of FIG. 6, it may be assumed that the sequence valve 70 is set to allow contraction the ram 62. The latter cannot then be expanded until the sequence valve is again operated.

A housing 76 is provided to enclose valve 70 and connected parts.

In the device shown, when the lift pin 12 enters the body 18 as the lifting device 14 is lowered over the pin, lever 71 will be pivoted by the mushroom head 77 of the pin when it reaches the upper limit of its travel in the socket, thereby operating the sequence valve 70. In that position the jaws may be moved from the position of FIG. 6 inwardly to engage the reduced stem section 59 of the pin. Thereafter as the device 14 is lifted the jaws come to rest upon the abutment bars 27 which carry the weight and the pin 12 is held in the position shown in FIG. 3. The ram cannot then again be operated to return the jaws to the position of FIG. 6 until the load is set down and the lift pin moves upward relative to the body and again pivots lever 71 to actuate the sequence valve.

I claim:

1. A coupling device adapted to receive, engage and support a headed pin projecting upright from a load to be lifted, comprising a body including a pair of laterally spaced plates and having means at the top to attach an elevating mechanism, means extending between the plates and cooperating therewith to form a socket for limiting entrance of the headed pin, a pair of opposed jaw members between said plates and below said socket pivotally mounted on axes normal to the axis of said pin in said socket and equidistant laterally thereof, abutment means carried by said plates below said jaw members limiting downward pivotal movement of the jaw members, said jaw members each having a rigid extension projecting upwardly to a point above said socket, a fluid ram connecting said extensions of the jaw members, said ram being operable to move said jaws from a pin-supporting position to a pin-release position and to return the jaws to the pin-supporting position, and control means actuated in response to the movement of said pin to control operation of said ram.

2. The coupling device set forth in claim 1, in which safety means is provided to prevent inadvertent operation of said fluid ram and to insure sequential steps of operation thereof, wherein said control means comprises a movable actuating member positioned to be engaged and moved by said headed pin seating in said socket, valve means operable by said actuating member and adapted to be connected in a fluid supply line to said ram between a source of pressure fluid and the ram.

3. The device set forth in claim 2, in which said valve means is a sequence valve.

4. A coupling device adapted to receive, engage and support a headed pin projecting upright from a load to be lifted, comprising a body including a pair of laterally spaced plates and having means at the top to attach an elevating mechanism, means extending between the plates and cooperating therewith to form a socket for limiting entrance of the headed pin, a pair of opposed jaw members between said plates and below said socket pivotally mounted on axes normal to the axis of said pin in said socket and equidistant laterally thereof, abutment means carried by said plates below said jaw members limiting downward pivotal movement of the jaw members, an elongated beamlike housing structure rigidly affixed to the upper portion of said plates above said socket and extending substantially beyond the lateral edges of the plates said jaw members each having a rigid extension projecting upwardly into said housing structure, a fluid ram within said housing structure connecting said extension of the jaw members, said ram being operable to move said jaws from a pin-supporting position to a pin-release position and to return the jaws to the pin-supporting position, and control means actuated in response to the movement of said pin to control the operation of said ram.

5. The device set forth in claim 4, in which the means forming said socket provides a space to receive the end of a valve actuating member of said control means, in which a movable valve actuating member is carried by one of said plates and projects into said space in the path of a pin received in the socket, and in which valve means operable by said valve actuating member and adapted to be connected in a fluid supply line to said ram between a source of pressure fluid and the ram is provided.